April 15, 1952  N. W. COREY  2,592,865
TAPE CUTTER
Filed Sept. 2, 1949
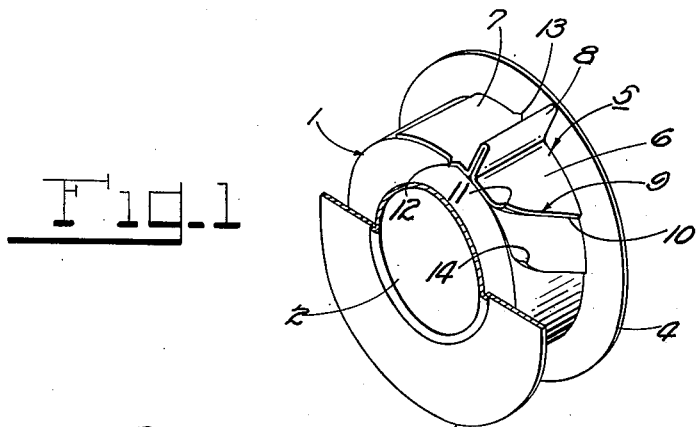
Fig.1
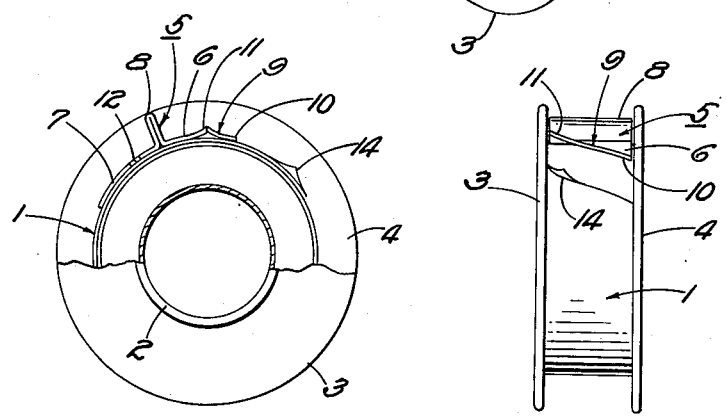
Fig.2    Fig.3
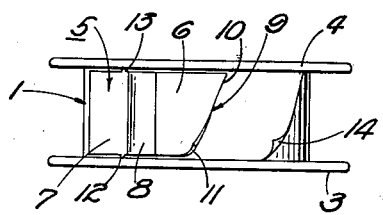    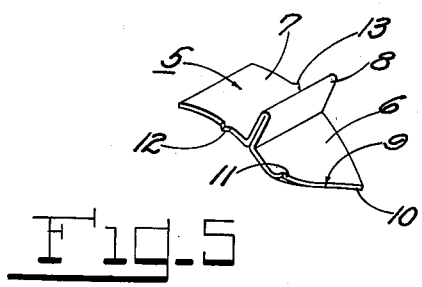
Fig.4    Fig.5
INVENTOR:
NORRIS W. COREY
by Dike, Calvert & Porter
Attys.

Patented Apr. 15, 1952

2,592,865

UNITED STATES PATENT OFFICE 2,592,865

TAPE CUTTER

Norris W. Corey, Manchester, N. H.

Application September 2, 1949, Serial No. 113,797

1 Claim. (Cl. 164—84.5)

This invention relates to a tape cutter, and particularly to a form of cutter suitable for use on rolled adhesive plaster, friction tape and the like.

The principal objects of the invention are to cut the tape so that the cut edge stands up when it can be reached when another length is needed, to avoid binding between the cutter and the spool, and to provide convenient means for shifting the position of the cutter.

Tape cutting devices are not widely employed in the trade, despite the fact that many forms of tape cutter have been proposed by inventors and those skilled in the art. Many of them have been too expensive to manufacture, in view of the low cost of wound tapes. Adhesive tape in particular is apt to stick after cutting, which has made cutting devices impractical, and many cutting devices tend to bind. The device of the present invention overcomes these difficulties.

The nature and objects of the invention will best be understood from the following description in cooperation with the accompanying drawings, in which:

Fig. 1 is a perspective view of a roll of tape in a spool and the tape cutter of the invention mounted thereon;

Fig. 2 is a view in side elevation;

Fig. 3 is a view in front elevation;

Fig. 4 is a top plan view; and,

Fig. 5 is a perspective view of the cutter alone.

In the drawings, a length of friction tape or surgeon's adhesive plaster 1 is wound on a spool 2 having the usual wide flanges 3 and 4. The tape cutter 5 mounted thereon has a cutting blade 6 and a tail portion 7, both of which, as shown in Fig. 2, are arcuately formed so as to ride closely over the rounded surface of the rolled tape. A handle 8 is formed by bending the material of which the blade 6 and skirt 7 are made, so that two closely adjacent or touching layers thereof extend directly upward from the middle of the cutter.

The blade 6 is provided with a cutting edge 9 which has its leading end 10 held close to the tape due to the fact that this region of the cutter follows the curve of the body portion. The edge 9 is formed with a slanting sinuous curve, the trailing edge 11 thereof being raised considerably from the tape, and not in line with the body curve.

The device is frictionally held to the flanges 3 and 4 by extrusions 12 and 13 which are formed by striking the metal of the cutter body and extruding it outwardly from the sides thereof. For best results, these protrusions are located behind the handle portion 8.

The protrusions 12 and 13 keep the cutter from falling away from the spool, but only slight force is required to overcome the friction between them and the spool flanges, and the cutter is, therefore, easily moved around the drum of the spool and inwardly toward it as the tape is used. Said portions also act as spacers, and prevent the cutter body from binding.

When the device is used to make a cut, the tape is severed straight across, but the last part to the cut is raised as shown at 14 in Figs. 3 and 4.

I claim:

A tape cutter adapted for use with a flanged tape spool comprising in combination a curved body portion conforming generally to the outer contour of a roll of tape, a handle portion, means for frictionally engaging the flanges of said spool at any preselected operative position of said cutter relative to said spool thereby maintaining said body portion against said outer tape contour, and a cutting edge at one end of said body portion, said cutting edge being formed as a continuous end edge of said body portion extending in a direction generally obliquely entirely across said tape and having a leading edge portion at one end disposed in continuation of the curved body portion and in contact with said tape roll and at the opposite end a substantially upwardly raised trailing edge portion separated from said tape roll, said edge extending from said leading edge and sinuously upwardly away from said tape roll toward said trailing edge and whereby when tape on the roll is lifted and severed against said cutting edge, a corner of said tape which is left adjacent said upward trailing edge tends to remain in an upward position and separated from the portion of the roll under it.

NORRIS W. COREY.

REFERENCES CITED

The following references are of record in the file of this patent:

UNITED STATES PATENTS

| Number | Name | Date |
|---|---|---|
| 1,880,950 | Ewing et al. | Oct. 4, 1932 |
| 2,038,910 | Stich | Apr. 28, 1936 |
| 2,138,979 | Mobley | Dec. 6, 1938 |
| 2,486,515 | Canham | Nov. 1, 1949 |

FOREIGN PATENTS

| Number | Country | Date |
|---|---|---|
| 428,640 | France | June 26, 1911 |